Patented July 2, 1935

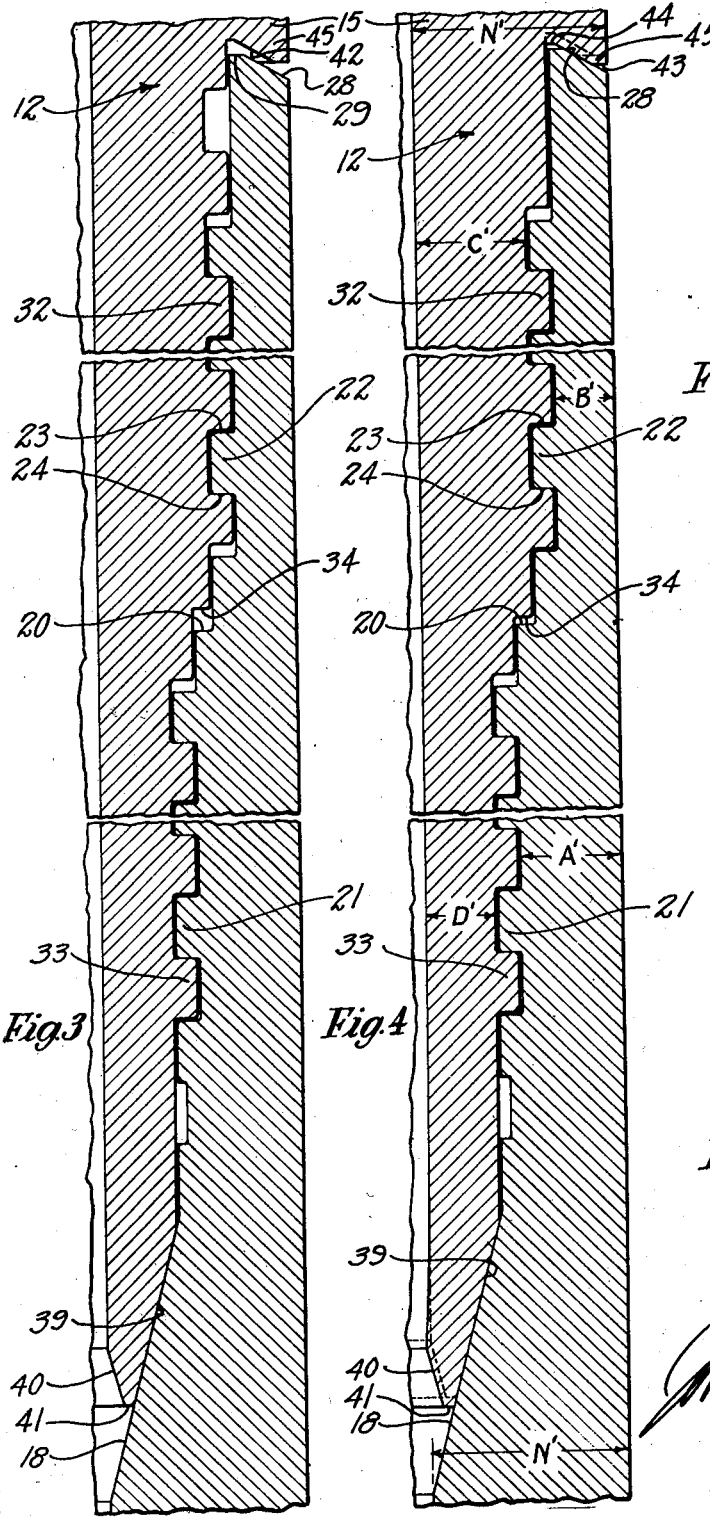

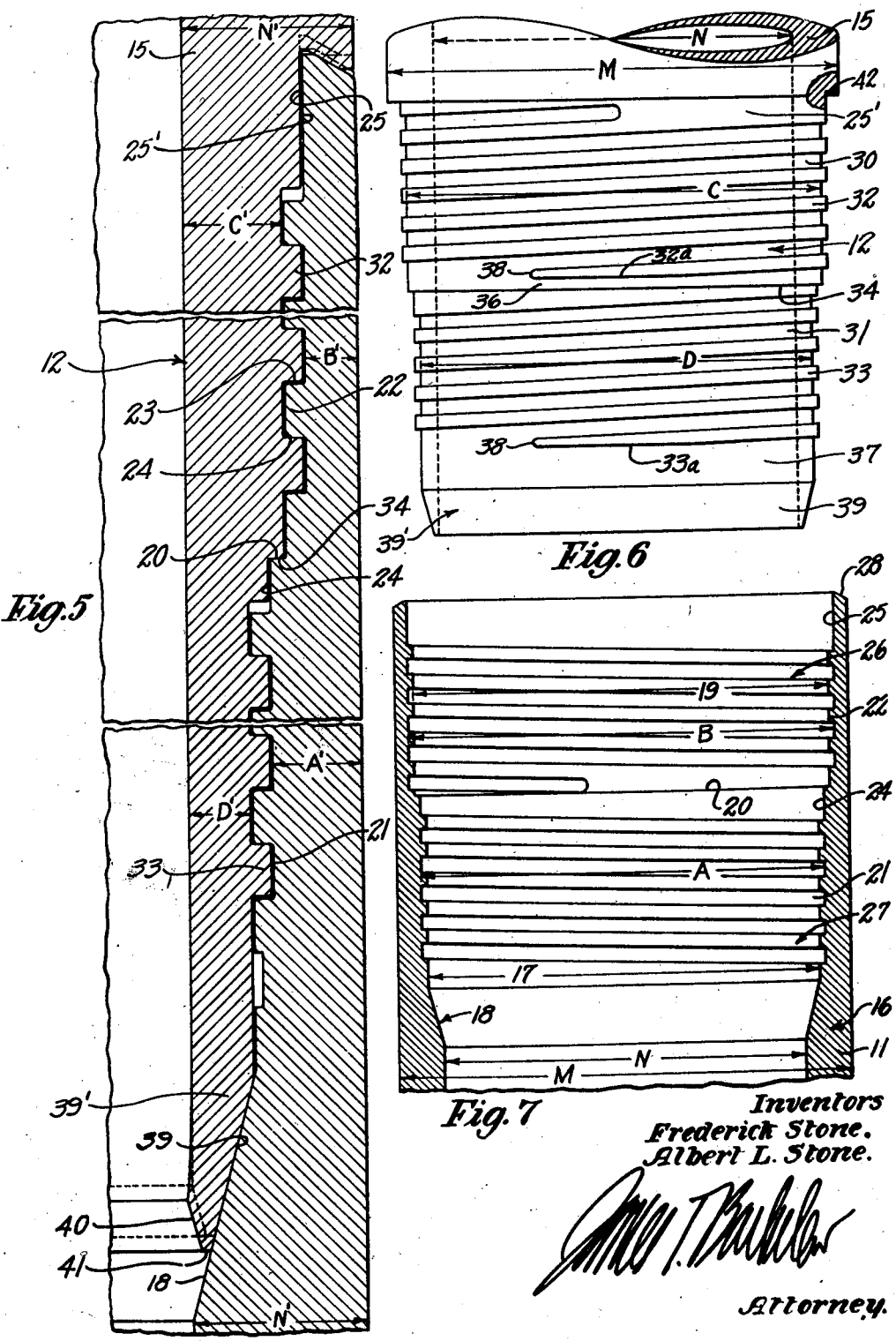

2,006,520

UNITED STATES PATENT OFFICE 2,006,520

CASING JOINT

Frederick Stone, Los Angeles, and Albert L. Stone, Redondo, Calif., assignors, by mesne assignments, to Hydril Company, Los Angeles, Calif., a corporation of California Application July 17, 1933, Serial No. 680,766

14 Claims. (Cl. 285—146)

This invention has to do generally with well pipe joints, and is more particularly concerned with joints for flush-joint casing used in lining well bores.

The general objects of the invention are to provide joints which may be made up with ease and dispatch, will mate in fluid-tight relationships and will effectively withstand the torsional and tensile strains to which they are exposed.

In the patent to Frederick Stone, one of the joint inventors herein, No. 1,932,427, October 31, 1933, and entitled "Well pipe joint", there is illustrated and claimed a well pipe joint, either drill-stem or casing, wherein the box and pin members are provided with complementary internal and external shoulders at opposite ends of the threaded portions, which shoulders meet in definite sequence to accomplish extremely beneficial results which are set forth in that application. However, the major portion of that application, except for the broader aspects of the invention, is directed to drill stem where the torque strains incidental to operation are extreme. In such drill stem it is not important that the full inside diameter of the stem be preserved through the joints, it consequently being possible to upset the box end of the joint or to utilize relatively thick-walled, separable boxes. As a consequence, and by following the teachings of that application, ample material was available to enable the fashioning of a quick-threading joint, either by tapering the pin and box or giving them two-step characteristics, or a combination of both.

However, in casing it is essential that substantially the full inside diameter of the pipe be preserved through the joints, eliminating the opportunity to upset appreciably the box end of the casing or to utilize thick-walled separable boxes. Likewise, it is highly desirable that the outer peripheral face of the joint be flush with the outer peripheral faces of the casing, making it possible to lower, without interference or adjustment, the casing through packing rings arranged at the top of the well bore, the use of such rings and the purposes thereof being well understood by those skilled in the art.

Since it is desirable that the weight and wall thickness of casing be kept to a minimum both for economic reasons and for maintaining as large a work-bore as possible, it follows that in a casing joint there is little enough material available for fashioning a casing joint with the shoulder characteristics described and claimed in the aforementioned application in connection with Fig. 6 thereof. It was considered impossible in a casing joint, flush inside and outside with the body of the casing, to combine these features of internal and external seating shoulders with taper or two-step characteristics to give quick-making and breaking, types of threads which necessarily require greater wall thickness than a thread having constant outside diameter. It is for this reason that the illustration of the casing joint in Fig. 6 of the aforementioned application showed a single, straight thread.

The present invention is directed to a solution of the problem, that is, we have provided a thin-wall casing joint, flush inside and outside with the casing, in which the internal and external seating shoulders are provided and function as in the aforementioned application, and also provided with two-step threads whereby the joint has the "quick-threading" characteristics so desirable to the industry, as is well recognized. And this is accomplished in such a manner that the minimum cross-section area of the joint as used for the calculation of tensile strength may be greater than one-half the full cross-section area of the casing.

Since the wall of the larger box-step is necessarily relatively thin with relation to the box walls of drill stem joints, and while the overhanging lip of the pin member hugs the extreme end of the box into pin, excessive torque strains tend to cause such telescopic movement of the joint parts as excessively to bulge the box outwardly at a point below the lip. We have therefore provided limiting shoulders intermediate the ends of the box and pin which are adapted to check such telescopic movement before the box has been bulged excessively. The relationship of these shoulders to the aforementioned internal and external shoulders is important and is fully pointed out in the detailed description, wherein further features and objects of the invention will be set forth.

In the drawings,

Fig. 1 is an elevation of an embodiment of our invention where one end of a casing length is directly coupled to the end of an adjacent length;

Fig. 2 is an elevation of an embodiment of the invention wherein a double-ended pin-coupling is interposed between two lengths of casing.

Fig. 3 is an enlarged fragmentary and longitudinally contracted section on line 3—3 of Fig. 1 or Fig. 2, but showing the parts before the joint is fully made up;

Figs. 4 and 5 are similar to Fig. 3 but showing successive stages in making up the joint;

Fig. 6 is a side elevation of the pin end of the joint; and

Fig. 7 is a medial section through the box end of the joint.

In Figs. 1 and 2 the casing lengths to be coupled are indicated at 10 and 11. In Fig. 1 these lengths are directly coupled, a pin portion 12, integral with casing 10, interfitting with a box 13 formed directly in casing 11. In Fig. 2 the boxes 13 are formed directly in the ends of both casings 10 and 11, while duplicate pin portions 12 are integral with the opposite ends of tubular coupling member 14, whose inside and outside peripheral faces are flush with the corresponding faces of the casing lengths. The sectional views may therefore be considered as taken on line 3—3 of either Figs. 1 or 2, the utilization of the double ended coupling or of the direct connection between casing lengths being merely a matter of choice.

Because the coupling 14 has the same diametrical characteristics as the casing lengths, said coupling may be considered as a casing in the terminology of the claims.

In order better to point out certain proportional and other relationships of parts of the illustrated embodiment of the invention, we will ascribe definite dimensions, angularities, etc. to such parts, but it is to be understood clearly that such ascription is not to be construed as in any way limitative on the claims and that even the proportions and relationships indicated are not to be construed as limitative on any of the claims except those in which they may be positively set up.

In this connection, the dimensions given are representative of a 10¾″ O. D., 45 pound casing. Figs. 3 to 5 are drawn at a scale of about four times the actual size of such casing, it following that controlling wall thicknesses and clearances which appear of considerable extent in the drawings are actually much diminished in the actual joints. Figures 6 and 7 show the wall thicknesses and thread sizes approximately equal to the actual dimensions of a casing joint of the above size, but the diameter of the casing in these views has been reduced very appreciably to conserve available space on the sheet. This explanation is made merely to emphasize the fact that the wall thickness in proportion to the diameter of the casing is much less than that indicated in Figs. 6 and 7.

The pin member of the joint may be considered as made up of body portion 15 which is the full-area, lower portion of casing length 10, and an axially projecting pin portion 12 of reduced diameter, the "normal" inside diameter N of the casing continuing through pin portion 12. The box member 16 of the joint may be considered as made up of the upper end of casing 11, the "normal" bore N of the casing being approximately the same diameter as the bore N of the pin member.

A counterbore 17 is cut in the box member, an annular, tapered shoulder or seating face 18 extending from bore N to bore 17. A second and larger counterbore 19 is cut adjacent the open end of the box, the junction between the counterbores being represented by an annular shoulder 20, said shoulder being substantially perpendicular to the axis X of the joint.

Internal threads 21 and 22 are then cut in the defining walls of counterbores 17 and 19, respectively. These threads are of the same pitch and outline characteristics, being cut with extreme accuracy so that one thread is, in effect, a continuation of the other as far as lead is concerned. The side faces 23, 24 are square cut and parallel but the width of the thread is about two and one-half times the depth thereof. As is usual in square threads, the width of the thread is slightly less than the distance between threads to provide clearance at one side thereof with respect to the mating thread. Further significant characteristics of the threads will be established at a later point in the description.

After threads 21 and 22 are cut, the upper ends of each are cut slightly back to provide the smooth cylindric surfaces 24 and 25.

The upper and larger counterbore with its thread, and the lower, smaller counterbore 17 with its thread, will be hereinafter generally termed as larger and smaller threaded steps 26 and 27, respectively. It will be seen that the minor diameter of the threads in box 26 is greater than the major diameter of the threads in box 27.

The upper end of box member 16 is tapered to provide an inwardly and upwardly inclining external shoulder 28, the extreme tip preferably being slightly flattened off as at 29. It will be noted that this shoulder inclines oppositely from shoulder 18, and at a more abrupt angle. In the joint of the proportions shown, it has been found satisfactory to incline faces 28 and 18 at angles of about 60° and 14°, respectively, with respect to axis X.

The pin portion 12 is formed with a relatively large upper threaded step 30 and a relatively small threaded lower step 31, complementary to and adapted to be taken in box steps 26 and 27, respectively. The threads 32 on step 30 and threads 33 on step 31 are complementary to threads 22 and 21, respectively. At the junction of the two steps is an annular shoulder 34 which is cut perpendicular to the axis of the joint and is adapted to oppose annular shoulder 20 and at certain times to be indicated, to engage that face 20. The lower ends of threads 32 and 33 are cut squarely back at 32a and 33a respectively to provide smooth cylindric faces 36 and 37, respectively, leaving the leading ends 38 of the threads well spaced from the ends of their respective steps.

The lower end of step 31 is tapered inwardly and downwardly to provide a tapered nose 39', the inclined face 39 of which is complementary in angularity to and adapted to seat in fluid-tight relationship with face 18, though face 39 is of slightly less longitudinal extent than is face 18. Preferably, the end of the nose is provided with a tapered counterbore 40 which thins down the tip of the nose appreciably, for a purpose to be described, though the tip presents a downward face 41 of relatively small extent.

An annular groove is cut in body portion 15 at the base of pin portion 12 to provide an inwardly and upwardly inclining shoulder 42 which is complementary to shoulder 28. Preferably, however, there are left slight square-cut faces 43 and 44 at the lower and upper ends, respectively, of the lip 45 formed by cutting this groove.

In making up the joint, the pin portion is dropped through the box until the pin steps engage the complementary box steps, whereupon the pin may be easily and freely rotated to engage threadably until the parts assume the position of Figure 3. It will be seen that by virtue of the ability of the smaller step on the pin to drop without interference through the larger step of the box, it is only necessary to rotate the pin sufficiently to advance it threadably the longitudinal extent of one step in order to make the joint up fully. Yet when the joint is made up there is thread engagement of an aggregate length equal to the combined length of the two step threads. The great desirability of this quick make-and-break feature is fully realized in the industry.

A further benefit results from the two-step characteristic by reason of the fact that the parts are so proportioned that the leading threads on the two pin steps simultaneously engage the uppermost threads of the two boxes. When the joint is "stabbed", that is, the pin dropped into the box, the load is taken simultaneously by and distributed between these two sets of thread shoulders, as distinguished from the situation where a single thread is used and the "stabbing" load is taken on a single set of thread shoulders.

As pin nose 39' goes toward its seat 18, the relatively sharp tip thereof clears away any foreign substances which may have gathered on said seat. The pin and mating box elements are so proportioned that when nose 39' seats on face 18, (Fig. 3) external shoulders 28 and 42 are spaced apart a given distance, while square-cut shoulders 20 and 34, which are intermediate the steps, are spaced further apart. In a joint of the proportion shown, and when faces 39 and 18 first engage, it is found satisfactory to have this spacing between shoulders 28 and 42, as measured at right angles to the shoulders about .012", and the spacing between shoulders 20—34 about .045", as measured in the direction of axis X. This initial engagement of faces 39 and 18 occurs when the joint is subjected to what we will term "normal torque strain" meaning by this a strain which does not tend appreciably to displace the metal of the box or pin.

The joint parts are then further threaded together until shoulders 28 and 42 engage (Fig. 4, where the original positions of the parts are indicated in dotted lines), at which time shoulders 20 and 34 are still spaced apart about .035". In order to accomplish this seating of shoulders 28—42, the joint must of course have been subjected to strain additional to the "normal torque strain" required initially to seat face 39 on face 18, and this additional torque strain is necessarily of a magnitude to displace the metal of the joint parts. Practically all this displacement occurs by an inward pressing of the nose 39', but this pressure only serves to make a tighter seal between faces 18 and 39 and does not deform the joint to an objectionable extent. Subsequently, when internal fluid pressure is applied to the joint, said pressure tends to urge said relatively thin nose radially outward and into even tighter circumferential contact with face 18. In any event faces 28—42 engage before the nose can expand the box beyond its elastic limit.

The engagement of shoulders 28—42 serves other useful purposes. The longitudinal overhanging of lip 45 with respect to the end of the box checks the tendency of the box to expand at the mouth thereof, where the box wall is particularly thin. The advantage of this feature is self-evident. Also, the inclined faces seat in fluid tight engagement, a feature of importance when it is realized that the external fluid pressure sometimes exceeds the internal pressure. Such external pressure tends to press the lip 45 inwardly against face 28 and is often of a magnitude to radially compress the box mouth in a manner to seat the smooth face 25 snugly about the unthreaded portion 25' of pin-step 30, thus improving the fluid seal. The initial seal between faces 28—42, effected manually by screwing the joint-parts together, prevents the subsequently applied external fluid pressure from entering between the box and pin to set up an equilibrium of pressure, which would prevent subsequent sealing by external fluid pressure, and, in the event it was sufficiently superior to the internal fluid pressure, might force a leak through the seal at 39—18.

Normally the joint need be made up no tighter than as indicated in Fig. 4, but it is difficult to apply exactly the force required to accomplish this end, with a consequent tendency to apply additional force to insure that the joint is properly made up. Furthermore, casing is sometimes rotated against a load, tending to make the joints up tighter. Due to the thinness of the box wall, the application of such additional torque forces in excessive amount is apt, if not checked, to act through the threaded connection to longitudinally compress the box against shoulder 42 and thus radially expand the box sufficiently to bulge it away from the pin below lip 45 to a degree impairing the usefulness of the joint. However, the proportioning of the joint parts is such that the application of additional torque strain (after the parts are in the position of Fig. 4) and a consequent further displacement of the metal of the joint-parts, brings limit shoulders 20—34 into engagement (Fig. 5, where the dotted lines indicate the original relative position of the parts) before the box has been bulged beyond its elastic limit and before the bulge is sufficient to spread the threads apart radially to an extent causing an appreciable loss of coupling efficiency.

This further tightening of the joint up to the limit established by the engagement of shoulders 20—34 tends also further to displace the nose 39 inwardly, but the telescopic movement is definitely stopped by the limit shoulders before this displacement is sufficient to damage the nose and before the tip 41 of the nose is projected into the "normal" bore N.

It is further to be noted that, except when shoulders 20—34 are in engagement, there is a spiral path formed by the thread clearances extending from internal seal to external seal. When shoulders 20—34 are engaged there is presented a barrier to the flow of fluid from seal to seal, so, in the event leakage develops at these seals, the said shoulder engagement forms an intermediate auxiliary seal.

It is also to be noted that each of the three sets of sequentially seating shoulders increases the resistance to excessive torque loads, in other words as the torque loads are increased, additional counteracting means progressively come into play.

It is to be borne in mind that foregoing references to "normal torque strains", "additional torque strains", and "displacement of the metal of the joint parts" are used only in the sense spoken of, and are not to be considered as otherwise limiting the requisite magnitude of the strains or displacements.

By way of prefacing the following discussion it may be said that the threads on the pin and box member are necessarily machined with extreme accuracy in order that it may be assured that when the joint is made up as in Fig. 4, the upper or effective side faces of pin threads 32 engage the under or effective side faces of box threads 22 at the same time the upper faces of pin threads 33 engage the lower faces of box threads 21.

In order to point out a proper proportioning of joint parts to bring about the advantageous ends set forth below, we will apply definite dimensions to certain of the parts, but as set forth in the forepart of the specification this is done for the purpose of illustration only and is not to be considered as in any way limitative on the claims.

Dimension A = 10.333"
Dimension B = 10.511"
Dimension C = 10.414"
Dimension D = 10.236"
Dimension M = 10.750"
Dimension N = 9.950"

Dimension A' = .2085"
Dimension B' = .1195"
Dimension C' = .2320"
Dimension D' = .1430"

Average Dimension N' = .4000"

Dimensions A and B have a tolerance of +.002" and −.000. Dimensions C and D have a tolerance of −.002 and +.000. Dimension N is not to exceed 9.997" in the pin end of joint.

Cross sectional area of—

A' = 6.905 sq. in.
B' = 3.991 sq. in.
C' = 7.421 sq. in.
D' = 4.534 sq. in.
N' = 13.006 sq. in.

From the above it will be seen that the sum of the cross-sectional areas at B' and D' (or the minimum area of the box plus the minimum area of the pin) equals 8.525 sq. in. which is greater than either the cross sectional area at A' (maximum area of box) or at C' (maximum area of pin). And the cross-sectional areas at A' (6.905 sq. in) and at C' (7.421 sq. in) are individually greater than one-half the full cross-sectional area of the box or pin as taken at N' (6.503 sq. in).

It is also to be noted that the cross-sectional area at B' is greater than one-half the cross sectional area at C' and that the cross-sectional area at B' is greater than one-half the cross-sectional area at A'. In other words, the minimum cross-sectional areas of the box and of the pin are greater than one-half the cross-sectional areas of their mating parts.

It will be noted that the dimensions given above are taken at the roots of the several threads. However, the depth (.047"), width (.1235"), and number of threads are such as insures sufficient cross-sectional area of effective thread-face contact and thread-width to transmit properly the loads from one joint part to the mating joint part without liability of shear before the joint fails elsewhere.

Now it has been pointed out that the upper or effective faces of the square-cut threads on the two steps of the pin seat simultaneously on the under or effective, square-cut faces of the threads on the two box steps. It follows that when the joint is put under tension, the load is so distributed along the full threaded extent of the joint parts that at no time is either the minimum cross-section B' of the box or the minimum cross section D' of the pin called upon to take the full load on said box or pin. Rather, said minimum areas come simultaneously into play to divide the load, and therefore the sum of the value representing these areas represents the effective cross-section area upon which their individual effective tensile strengths may be calculated.

Since this sum has been indicated as being greater than either the maximum area (at A') of the box or the maximum area (at C') of the pin it follows that the minimum area taken for calculation of the tensile strength of the joint will not be the individual minimum areas of the box or pin, but rather the lesser of the maximum areas of the box or pin, namely, the area at A' which equals 6.905 sq. in. Since this last named area is greater than one-half the full area of either joint part taken at N' (one-half such area equals 6.503 sq. in.) it follows that the tensile strength of the joint is greater than one-half the strength of the full pipe, and this in spite of the fact that the quick-making-thread and multi-shoulder-seating characteristics have been worked into this thin-walled, flush-joint casing. In the example given, the tensile strength of the joint is approximately 53 per cent of the strength of the full casing.

Repeated tests have demonstrated the full truth of the above statements. Whenever the joints made as above have been tested to destruction, failure has always occurred across the inner step of the box, and the strength of the joint in the proportion to the strength of the full casing has proven to be that noted above.

In order theoretically to attain the desired ratio of joint-strength to full-casing strength, with the area at A' representing the minimum area of the joint for calculation of the strength thereof, it will be seen that it is only necessary that the sum of areas B' plus D' be not less than the area at A' (in other words, the sum may equal the area at A'), and therefore the proportion as thus stated in the claims. In fact, a proportion of one-to-one may be used practicably when the inside and outside diameters of the casing lengths are constant.

However, usual commercial casing, when it leaves the rolling mill, is accurately rolled to a standard outside diameter, but the inside diameters vary within certain limits. Since, in making up our type of joint, the machining is done on the inside of the box end, the wall thickness of the box may be accurately determined, but the machining is done on the outside of the pin end, and therefore the machined, pin-wall thicknesses will vary. Therefore it is preferable from a practical standpoint to insure that such sum of cross-sectional areas never falls below the allowable limit by proportioning the parts so said sum will normally be well above said limit, thus having a working range to care for casing inequalities. The illustrative dimensions given above set forth such a situation.

While we have illustrated and described a preferred embodiment of our invention, it is to be understood that various changes in design and structure and arrangement may be made without departing from the spirit and scope of the appended claims.

We claim:

1. A casing joint including an internally threaded box member and an interfitting externally threaded pin member, said box member having one internal seating shoulder at a point spaced appreciably from the open end thereof, an external seating shoulder inclining inwardly towards said end, and a second internal shoulder between said aforementioned shoulders, said second internal shoulder extending substantially perpendicular to the axis of the box member; and said pin member having complementary seating faces arranged to engage sequentially with adjacent shoulders on the box member when the joint parts are set up, said one internal shoulder being the first to engage its complementary seating face and the external shoulder being the second to engage its complementary face, the clearance between the face of the second internal shoulder of the box and the adjacent face of the pin member being so proportioned that the faces are engaged before the box is expanded beyond its elastic limit.

2. A casing joint including an internally threaded box member and an interfitting externally threaded pin member, said box member having one internal seating shoulder at a point spaced appreciably from the open end thereof and inclining outwardly toward said end, an external seating shoulder inclining inwardly towards said end, and a second internal shoulder between said aforementioned shoulders, said second internal shoulder extending substantially perpendicular to the axis of the box member; and said pin member having complementary seating faces arranged to engage sequentially with adjacent shoulders on the box member when the joint parts are set up, said one internal shoulder being the first to engage its complementary seating face and the external shoulder being the second to engage its complementary face, the clearance between the face of the second internal shoulder of the box and the adjacent face of the pin member being so proportioned that the faces are engaged before the box is expanded beyond its elastic limit.

3. A casing joint including an internally threaded box member and an interfitting externally threaded pin member, said box member having one internal seating shoulder at a point spaced appreciably from the open end thereof, an external seating shoulder inclining inwardly towards said end and a second internal shoulder between asid aforementioned shoulders; and said pin member having complementary seating faces arranged to engage sequentially with adjacent shoulders on the box member when the joint parts are set up, said one internal shoulder being the first to engage its complementary seating face and the external shoulder being the second to engage its complementary face, the clearance between the face of the second internal shoulder of the box and the adjacent face of the pin member being so proportioned that the faces are engaged before the box is expanded beyond its elastic limit.

4. A casing joint embodying an internally threaded box member and an externally threaded pin member adapted to be threadably connected, an internal seating shoulder on the box member and spaced appreciably from the open end thereof, a complementary seating face on the pin member, an external seating shoulder on the box member and a complementary seating face on the pin member, a second internal seating shoulder on the box member between said internal and external shoulders, and a complementary seating face on the pin member, said first-mentioned internal shoulder, said external, shoulder, and said second-mentioned internal shoulder seating on their respective complementary pin-member seating faces in succession and in the order named when said box and pin members are threadably connected, the first seating occurring when the joint is subjected to predetermined torque strain, the second seating occurring when the joint is subjected to additional torque strain of a magnitude to displace the metal of the joint parts, and the third seating occurring when the joint is subjected to still greater torque strain and of a magnitude further to displace the metal of the joint parts.

5. A casing joint embodying an internally threaded box member and an externally threaded pin member adapted to be threadably connected, an internal seating shoulder on the box member and spaced appreciably from the open end thereof, a complementary seating face on the pin member, an external seating shoulder on the box member and a complementary seating face on the pin member, a second internal seating shoulder on the box member between said internal and external shoulders, said second internal shoulder extending substantially perpendicular to the axis of the box member, and a complementary seating face on the pin member, said first-mentioned internal shoulder, said external shoulder, and said second-mentioned internal shoulder seating on their respective complementary pin-member seating faces in succession and in the order named when said box and pin members are threadably connected, the first seating occurring when the joint is subjected to predetermined torque strain, the second seating occurring when the joint is subjected to additional torque strain of a magnitude to displace the metal of the joint parts, and the third seating occurring when the joint is subjected to still greater torque strain and of a magnitude further to displace the metal of the joint parts.

6. A casing joint embodying a box member and a mating pin member, a box member having a two-step, internally threaded bore, the step of larger diameter opening to the end of the box member, an internal annular and tapered seat extending inwardly from the end of the smaller step, the minor diameter of the larger step being greater than the major diameter of the smaller step, an annular shoulder between the steps and extending substantially perpendicular to axis of the box; an axially projecting pin portion of reduced diameter, said pin portion being two-stepped and externally threaded to be threadably taken in said box steps, a tapered nose on the outer end of the pin portion, said nose being angularly complementary to and being adapted to seat on said tapered seat when said box and pin member are threadably connected under predetermined torque strain, an external seating shoulder on the box member and a complementary seating face on the pin member, said external shoulder and seating face engaging one another when the joint is subjected to additional torque strain of a magnitude to displace the metal of the joint parts, and an annular shoulder on the pin member between the threaded steps and extending substantially perpendicular to the axis of the pin member, said annular shoulders on the pin and box member engaging one another when the joint is subjected to still greater torque strain and of a magnitude further to displace the metal of the joint parts.

7. A casing joint embodying a box member and a mating pin member, the box member having a two-step, internally threaded bore, the step of larger diameter opening to the end of the box member, an internal annular seat at the inner end of the smaller step, the minor diameter of the larger step being greater than the major diameter of the smaller step, an annular shoulder between the steps and extending substantially perpendicular to axis of the box; an axially projecting pin portion of reduced diameter, said pin portion being two-stepped and externally threaded to be threadably taken in said box steps, a nose on the outer end of the pin portion, said nose being adapted to seat on said seat when said box and pin member are threadably connected under predetermined torque strain, an external seating shoulder on the box member and a complementary seating face on the pin member, said external shoulder and seating face engaging one another when the joint is subjected to additional torque strain of a magnitude to displace the metal of the joint parts, and an annular shoulder on the pin member between the threaded steps and extending substantially perpendicular to the axis of the pin member, said annular shoulders on the pin and box member engaging one another when the joint is subjected to still greater torque strain and of a magnitude further to displace the metal of the joint parts.

8. A casing joint embodying a box member and a mating pin member, the box member having a two-step, internally threaded bore, the step of larger diameter opening to the end of the box member, an internal annular and tapered seat extending inwardly from the end of the smaller step, the minor diameter of the larger step being greater than the major diameter of the smaller step, an annular shoulder between the steps and extending substantially perpendicular to axis of the box; an axially projecting pin portion of reduced diameter, said pin portion being two-stepped and externally threaded to be threadably taken in said box steps, a tapered nose on the outer end of the pin portion, said nose being angularly complementary to and being adapted to seat on said tapered seat when said box and pin member are threadably connected under predetermined torque strain, an external tapered seating shoulder on the box member and a complementary seating face on the pin member, said external shoulder and seating face engaging one another when the joint is subjected to additional torque strain of a magnitude to displace the metal of the joint parts, and an annular shoulder on the pin member between the threaded steps and extending substantially perpendicular to the axis of the pin member, said annular shoulders on the pin and box member engaging one another when the joint is subjected to still greater torque strain and of a magnitude further to displace the metal of the joint parts.

9. A casing joint embodying a box member and an interfitting pin member, said members having interfitting threaded portions, complementary faces on the two members at opposite ends of the threaded portions and adapted to seat in fluid tight relation when the joint is made up under predetermined torque strain, and complementary shoulders on the two members and intermediate the ends of the threaded portions, said shoulders being substantially perpendicular to the axis of the joint and being spaced apart when the joint is so made up, said shoulders being adapted to seat on one another in fluid tight relation when the joint is subjected to additional torque strain of a magnitude to displace the metal of the joint parts.

10. A casing joint embodying a box member and an interfitting pin member, said members having interfitting threaded portions, complementary faces on the two members at opposite ends of the threaded portions and adapted to seat in fluid tight relation when the joint is made up under predetermined torque strain, the faces at opposite ends of said threaded portions inclining with respect to the axis of the joint and in opposite directions, and complementary shoulders on the two members and intermediate the ends of the threaded portions, said shoulders being substantially perpendicular to the axis of the joint and being spaced apart when the joint is so made up, said shoulders being adapted to seat on one another in fluid tight relation when the joint is subjected to additional torque strain of a magnitude to displace the metal of the joint parts.

11. In a quick-threading flush-joint for casing, a tubular box member and an interfitting tubular pin member, said box and pin members being of substantially equal outside diameters and having normal bores of substantially equal diameters, the box member having a straight-wall bore of relatively larger diameter opening to one end thereof, the defining wall of said bore having an internal thread with the effective side face thereof square-cut; said box member also having a straight-wall bore of less diameter than and opening to said relatively large bore but of greater diameter than the normal bore, the defining wall of said bore of lesser diameter having an internal thread of the same pitch and effective side face characteristics as the first mentioned thread; said pin member having complementary threaded portions adapted to be screwed into said threaded bores with the threads in the two bores seating similarly with the respective pin threads; the sum of the cross-section area of the box member wall about the relatively large diameter bore and the cross-section area of that portion of the pin member which interfits with the box-bore of lesser diameter, being at least as great as either the cross-section area of the box wall about the bore of lesser diameter or the cross-section area of that portion of the pin member which interfits with said bore of relatively larger diameter.

12. In a quick-threading flush-joint for casing, a tubular box member and an interfitting tubular pin member, said box and pin members being of substantially equal outside diameters and having normal bores of substantially equal diameters, the box member having a bore of relatively larger diameter opening to one end thereof, the defining wall of said bore having an internal thread with the effective side face thereof square-cut; said box member also having a bore of less diameter than and opening to said relatively large bore but of greater diameter than the normal bore, the defining wall of said bore of lesser diameter having an internal thread of the same pitch and effective side face characteristics as the first mentioned thread; said pin member having complementary threaded portions adapted to be screwed into said threaded bores with the threads in the two bores seating similarly with the respective pin threads; the sum of the cross-section area of the box member wall about the relatively large diameter bore and the cross-section area of that portion of the pin member which interfits with the box-bore of lesser diameter, being at least as great as either the cross-section area of the box wall about the bore of lesser diameter or the cross-section area of that portion of the pin member which interfits with said bore of relatively large diameter; and each of the last two mentioned cross-section areas being greater than one half the normal cross-section area of the box or pin members.

13. In a quick-threading flush-joint for casing, a tubular box member and an interfitting tubular pin member, said box and pin members being of substantially equal outside diameters and having normal bores of substantially equal diameters, the box member having a straight-wall bore of relatively large diameter opening to one end thereof, the defining wall of said bore having an internal thread with the effective side face thereof square-cut; said box member also having a straight-wall bore of less diameter than and opening to said relatively large bore but of greater diameter than normal bore, the defining wall of said bore of lesser diameter having an internal thread of the same pitch with the effective side face characteristics as the first mentioned thread; said pin member having complementary threaded portions adapted to be screwed into said threaded bores with the threads in the two bores seating similarly with the respective pin threads, the root diameter of the threads on the larger portion of the pin being greater than the outside diameter of the threads on the smaller portion of the pin, the sum of the cross-section area of the box-member wall about the relatively large diameter bore and the cross-section area of that portion of the pin member which interfits with the box-bore of lesser diameter, being at least as great as either the cross-section area of the box wall about the bore of lesser diameter or the cross-section area of that portion of the pin member which interfits with said bore of relatively large diameter.

14. In a quick-threading flush-joint for casing, a tubular box member and an interfitting tubular pin member, said box and pin members being of substantially equal outside diameters and having normal bores of substantially equal diameters, the box member having a straight-wall bore of relatively large diameter opening to one end thereof, the defining wall of said bore having an internal thread with the effective face thereof square-cut, an external, tapered shoulder at said one end of the box member; said box member also having a straight-wall bore of less diameter than and opening to said relatively large bore but of greater diameter than the normal bore, the defining wall of said bore of lesser diameter having an internal thread of the same pitch and effective side face characteristics as the first mentioned thread, an internal, tapered shoulder at the inner end of said bore of lesser diameter, said shoulder tapering oppositely from the external shoulder, said pin member having complementary threaded portions adapted to be screwed into said threaded bores with the threads in the two bores seating similarly with the respective pin threads, and a pair of shoulders on the pin member complementary, one each, to the aforementioned external and internal shoulders, the sum of the cross-section area of the box member wall about the relatively large diameter bore and the cross-section area of that portion of the pin member which interfits with the box-bore of lesser diameter, being at least as great as either the cross-section of the box wall about the bore of lesser diameter or the cross-section area of that portion of the pin member which interfits with said bore of relatively large diameter.

FREDERICK STONE.
ALBERT L. STONE.